US008201801B2

(12) United States Patent
Rosabal

(10) Patent No.: US 8,201,801 B2
(45) Date of Patent: Jun. 19, 2012

(54) SHEAR PIN ACTIVATED OVERHEAD SIGN BRACKET

(76) Inventor: Felix Antonio Rosabal, Miami, FL (US)

( * ) Notice: Subject to any disclaimer, the term of this patent is extended or adjusted under 35 U.S.C. 154(b) by 117 days.

(21) Appl. No.: 12/540,909

(22) Filed: Aug. 13, 2009

(65) Prior Publication Data

US 2011/0035978 A1 Feb. 17, 2011

(51) Int. Cl.
*F16M 13/00* (2006.01)

(52) U.S. Cl. ........................... 248/548; 248/549; 40/602

(58) Field of Classification Search .................. 248/548, 248/549, 909; 40/602; 411/4; 52/98
See application file for complete search history.

(56) References Cited

U.S. PATENT DOCUMENTS 3,521,390 A * 7/1970 Carlson ........................... 40/602
5,432,640 A * 7/1995 Gilbert et al. ................. 359/841
6,308,927 B1 * 10/2001 Leahy ........................... 248/548
7,434,778 B2 * 10/2008 Leahy et al. .................. 248/548
2009/0072115 A1 * 3/2009 Worley ......................... 248/548

* cited by examiner

*Primary Examiner* — Nkeisha Smith
(74) *Attorney, Agent, or Firm* — Christopher J. Vandam, PA; Chris Vandam

(57) ABSTRACT

A sign bracket for over-road highway signs and other signs. The bracket is comprised of a first assembly attached to the sign and a second assembly attached to a support structure. A shear pin prevents relative movement between the first assembly and second assembly in its normal state. When sufficient pressure is exerted on the sign the shear pin shears and the first assembly is freed to rotate the sign approximately ninety degrees. The sign is essentially laid flat either face up from wind force striking the face of the sign or face down from wind striking the rear of the sign. When the sign is laid flat it produces substantially reduced wind resistance and the support structure remains intact. The sign may then easily re-erected by insertion of a new shear pin.

2 Claims, 4 Drawing Sheets

SHEAR PIN ACTIVATED OVERHEAD SIGN BRACKET

BACKGROUND OF THE INVENTION

1. Field of the Invention

The present invention relates to sign brackets, and more particularly, to highway overhead sign brackets that are capable of withstanding high wind load forces by changing the angle of incidence of the wind relative to the sign.

2. Description of the Related Art

Several designs for sign brackets have been designed in the past. None of them, however, includes a device that allows a highway sign to shift to the horizontal under heavy wind load to reduce the stress on both the sign and support structure while remaining easy to re-erect after risk of damaging winds subside.

Applicant believes that the closest reference corresponds to U.S. Pat. No. 4,503,631 issued to Kelly. However, it differs from the present invention because the Kelly device does not allow easy adjustment of the shear pressure exerted onto the sign to allow the sign to freely move and permits dangerous swinging of the sign after it begins to move. Furthermore, the Kelly design requires significant structure above the sign that is unnecessary in Applicant's invention.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a sign bracket that will allow a sign and supporting structure to survive high wind loads, such as during a hurricane.

It is an object of the present invention to provide a sign bracket that allows the use of significantly lighter and more economical sign support structure because the sign will change profile at a predetermined wind speed and therefore will impart less stress onto the support structure.

It is another object of this invention to provide a uniform device that is scalable to effectively work with a wide variety of sign dimensions.

It is still another object of the present invention to provide a sign bracket that is easy to re-erect after a high wind event.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
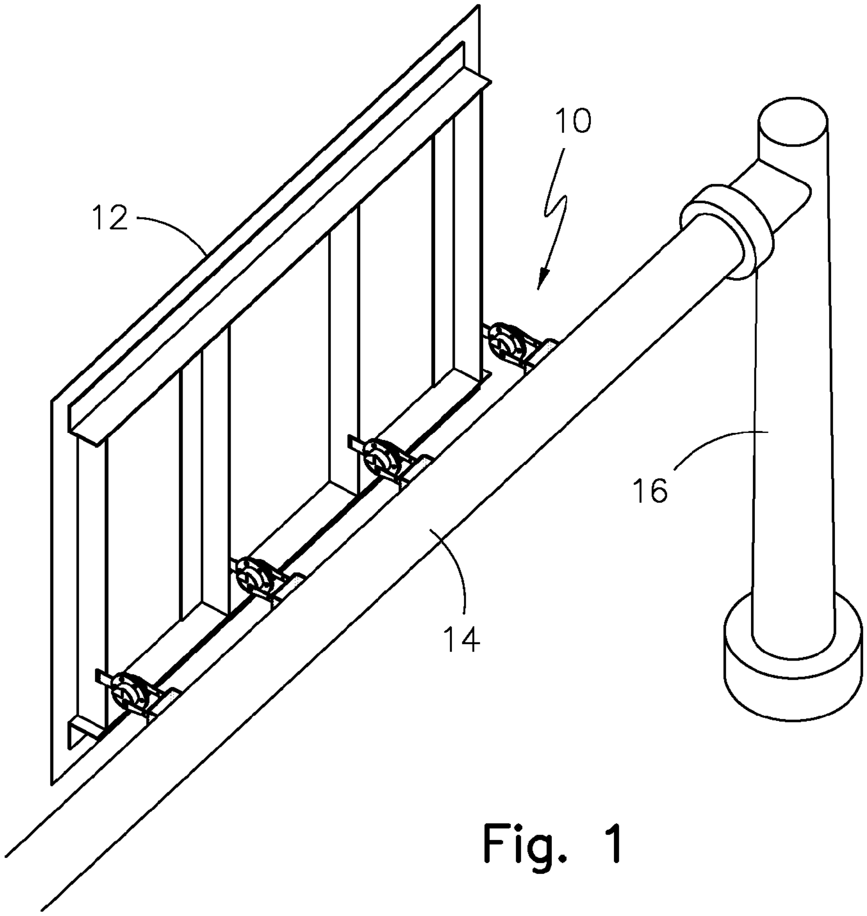
FIG. 1 represents a perspective view of multiple sign brackets holding a sign.

Referring now to the drawings, where the present invention is generally referred to with numeral 10, it can be observed that it basically includes a hub assembly 18, a drum assembly 32, a drum assembly 44 and a plate assembly 68.

FIG. 1 shows the device 10 as it could be in actual use to support a sign 12. Overhead highway signage is often displayed over a roadway to provide navigational information to passing motorists. The present invention relates to brackets that connect a sign 12 to a support structure 14. A typical configuration includes a vertical support post 16 affixed to a horizontal support post 14. The present invention is an improved bracket 10 that connects the sign 12 to the horizontal support post 16. In some configurations two vertical support posts 16 connect at each end of the horizontal support bar 14 to span the roadway below and provide for a more robust sign support structure.

Figure 2:
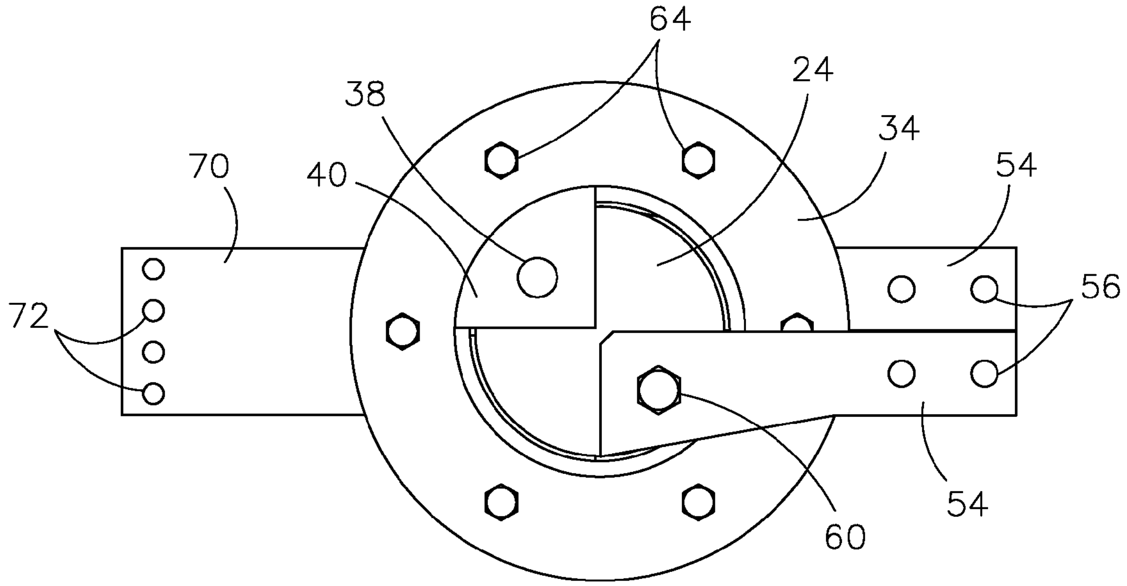
FIG. 2 shows an elevation view of a sign bracket in its normal configuration.
Figure 3:
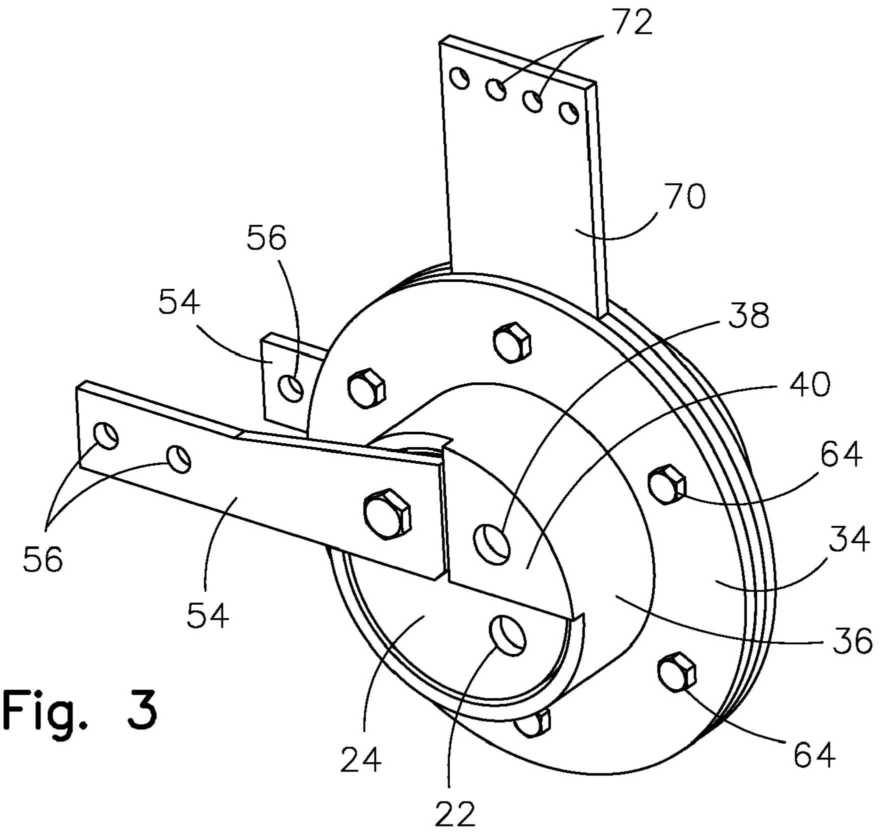
FIG. 3 illustrates a perspective view of a sign bracket after a front wind load.
Figure 4:
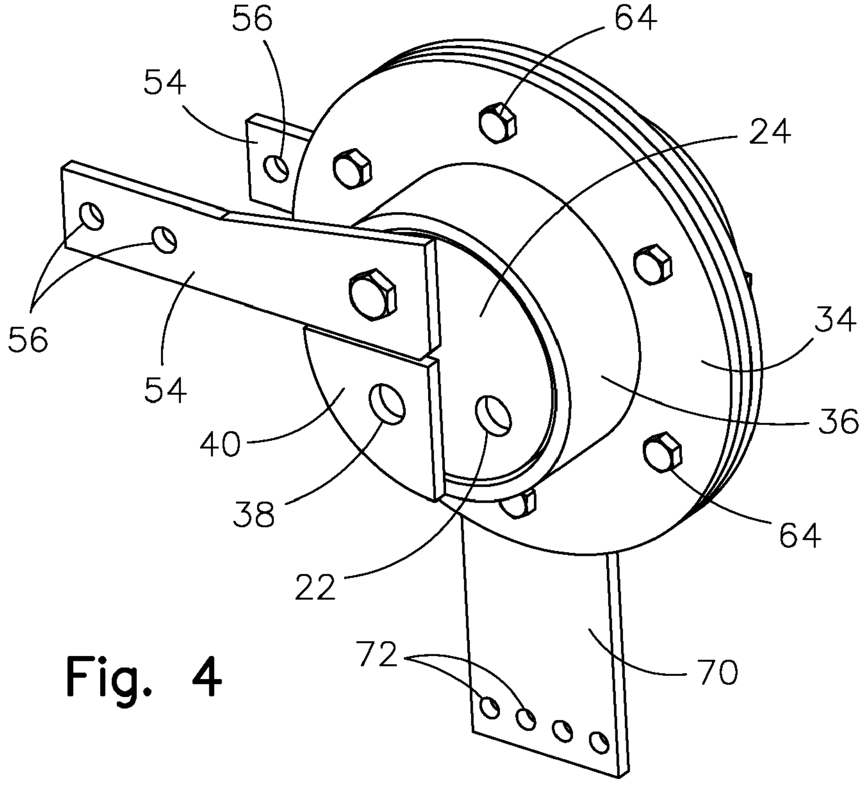
FIG. 4 is a representation of a perspective view of a sign bracket after a rear wind load.

Now referring to FIGS. 2, 3 and 4 where the device is shown assembled and in more detail. In these representations the device is shown to include, inter alia, bores 72, tab 70, tab 40, shear pin bore 38, fasteners 64, disk 24, flange 34, swing arm 54, bores 56, shear pin bore 22, drum 36 and fastener 60. Generally, a pair of swing arms 54, one on each side of the device, are affixed to a horizontal support 14 such as demonstrated in more clearly in FIG. 8. In a preferred configuration the swing arms 54 are affixed to the horizontal support 14 by means of bolts (not shown) that penetrate bores 56 and connect to a corresponding mounting means (example shown in FIG. 8 and discussion below) on the horizontal support 14. Alternative means to affix the swing arms 54 to the horizontal support could include rivets, welding, brazing, clamping or other commonly known methods of attaching metal to metal.

Tab 70 connects the device to a sign 12 by means of bolts (not shown) fit through bores 72 and the sign 12. Alternative means to affix the tab 70 to the sign 12 could include rivets, welding, brazing, clamping or other commonly known methods of attaching metal to metal.

FIG. 2 shows the device configured for normal use with the tab 70 projecting from the flange 34 on the opposite side of the swing arms 54. This configuration holds the face of the sign 12 substantially vertical so that it can be read by passing motorists. In actual use a shear pin 62 (shown in FIG. 5) penetrates shear pin bore 38 to prevent rotational movement of the disk 24 relative to the flange 34. Fastener 60 affixes swing arm 54 to disk 24. Disk 24 is rigidly affixed to a first end of axle 20 and disk 26 is rigidly affixed to a second end of axle 20.

FIG. 3 is an example an up safe mode of the device after the shear pin 62 has broken under wind load on the obverse of the sign 12 and the sign 12 has been permitted to fall back to face skyward above the device. Generally, tab 70, flange 34 and tab 40 are immovable relative to each other. Similarly, swing arms 54 are immovably affixed one each to disk 24 and corresponding disk 26. During the transition from normal use shown in FIG. 2 to the up safe mode in FIG. 3 the shear pin 62 fractures and the tab 70, flange 34 and tab 40 rotate around disk 24 and disk 26 until tab 40 and tab 50 (shown in FIG. 5) contacts the edge of swing arms 54 and prevents further rotation. The total relative rotation from normal mode to up safe mode is about plus ninety degrees.

FIG. 4 shows the device in a down safe mode after the shear pin 62 has broken under wind load to the reverse side of the sign 12 and the sign 12 has been permitted to fall forward to face toward the ground below the device. During the transformation from normal use shown in FIG. 2 to down safe mode shown in FIG. 4 the shear pin 62 fractures and the tab 70, flange 34 and tab 40 rotate around disk 24 and disk 26 until tab 40 and tab 50 (shown in FIG. 5) contacts the edge of swing arms 54 and prevents further rotation. The total relative rotation from normal mode to down safe mode is about minus ninety degrees.

Figure 5:
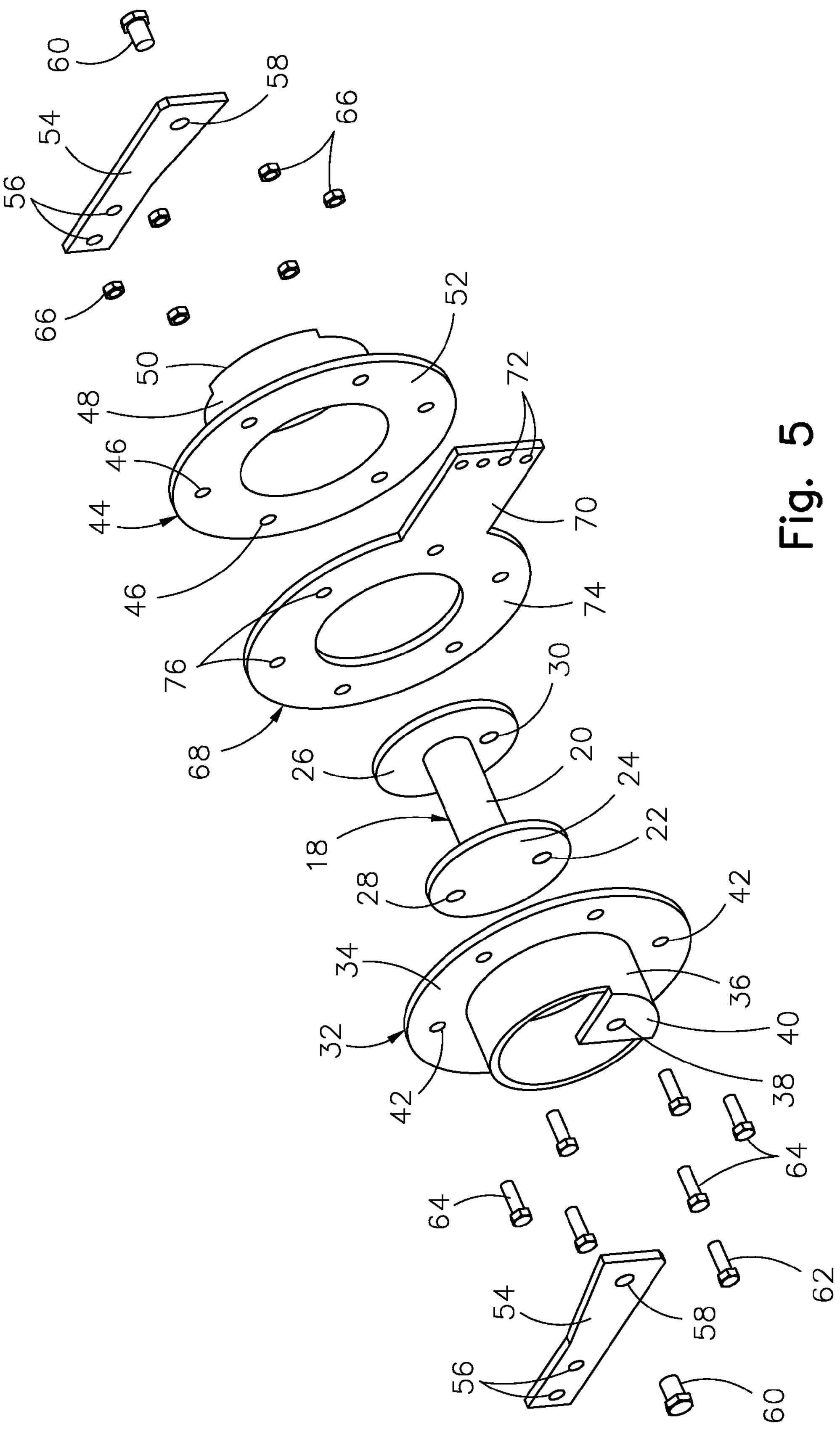
FIG. 5 is an exploded perspective view of the various components of a sign bracket.

FIG. 5 shows an exploded view of the device further clarifying interaction between the various components of the device and are shown to include in addition to other elements previously described, inter alia, an axle 20, a disk 26, a swing arm bore 28, a swing arm bore 30, bores 42, bores 46, a drum 48, a tab 50, a flange 52, a bore 58, fasteners 66, plate 74 and bores 76. Generally the device is comprised of a first assembly and a second assembly that are moveable relative to each other when the shear pin 62 is not connecting them together. The first assembly is affixed to the sign 12 and the second assembly is affixed to the horizontal support 14.

The first assembly is comprised of, inter alia, the plate assembly 68 sandwiched between the drum assembly 32 and the drum assembly 44. A multiplicity of fasteners 64 fit through bores 42, bores 76 and bores 46 and are secured with fasteners 66. Fasteners 64 and fasteners 66 could be bolts and nuts, respectively, or other means commonly used to connect metal to metal such as rivets, welds, brazing or clips. Drum assembly 32 is substantially identical to drum assembly 44.

The second assembly is comprised of, inter alia, the hub assembly 18 and swing arms 54. Generally, the hub assembly 18 is placed into the first assembly before the first assembly is bolted together. Then the swing arms 54 are affixed to the disk 24 and disk 26, respectively. Fasteners 60 penetrate bores 58 on each of the swing arms 54 and are affixed to disk 24 and disk 26 at bore 28 and bore 30, respectively.

To prevent relative movement between the first assembly and second assembly the shear pin 62 passes through bore 38 on the first assembly and bore 22 on the second assembly. Only when the torque between the first assembly and second assembly is sufficient to shear the shear pin 62 will the first assembly be able to rotate relative to the second assembly. Optionally a solid state lubricant may be present on the rim of the disk 24 to facilitate rotation and inhibit corrosion. The drawings show that a shear pin 62 is only present connecting drum assembly 32 and disk 24 but it should be recognized that an additional shear pin between drum assembly 44 and disk 26 could also be present or alternatively present.

Figure 6:
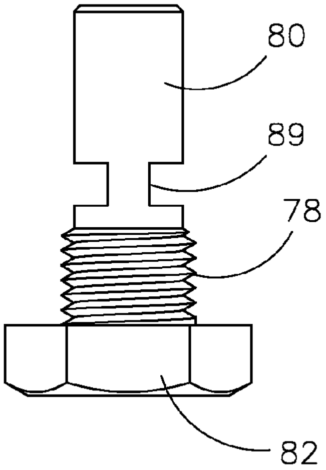
FIG. 6 is an elevation view of a variation of a shear pin.
Figure 7:
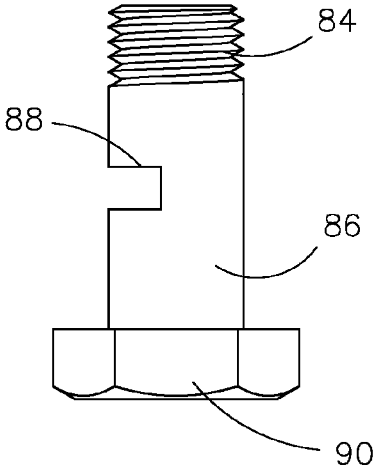
FIG. 7 is an elevation view of another variation of a shear pin.

FIGS. 6 and 7 show various features of alternative shear pin designs and include, inter alia, threads 78, a shaft 80, a head 82, threads 84, a shaft 86, a key 80, a key 89 and a head 90. Alternative shear pins are shown to provide various shear pins with specific predetermined shear or break point. There are advantages of having common diameter shear pins with differing shear points in that only the shear pin differs for different applications and the balance of the device remains consistent.

In one variation the placement of the threads 78 on the shaft 80 are adjacent to the head 82. If this variation is utilized with corresponding threads in shear pin bore 38 and would hold the shear pin in place and allow for easy replacement. Key 89 is optionally provided to allow for a precisely calibrated shear strength while maintaining a constant diameter of the shaft 80 and threads 78. The dimensions of the key 89 may be varied to adjust the shear strength. Alternatively, threads 84 may be on the shaft 86 opposite the head 90 and could engage into threaded shear pin bore 22.

To calibrate the force at which a shear pin will shear a key 88 is optionally provided. Generally the presence of a key 88 will reduce the force required to break the shaft 88. The larger the key 88 relative to the shaft 88 the less force required to shear the shear pin. It should be appreciated that any shear pin design could have threads at either end of the shaft or no threads at all and optionally have a key present. The head 82 or head 90 is preferably a hex head but could also take other forms to permit easy installation and removal of a shear pin.

Figure 8:
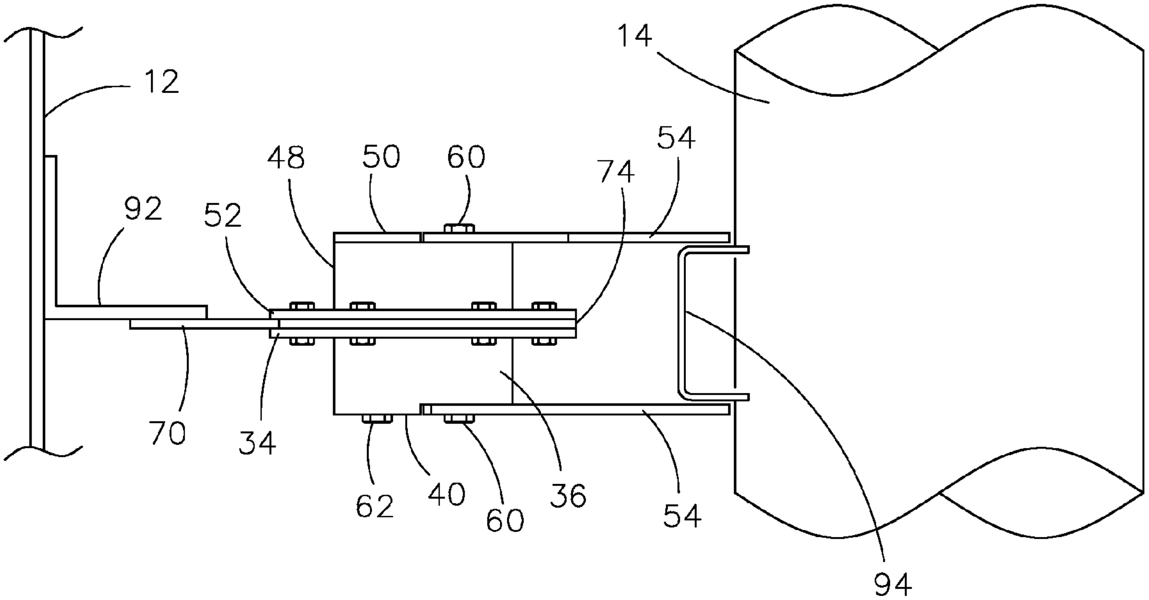
FIG. 8 is a plan view of the device as it might be attached to a sign and a sign post.

FIG. 8 is provided to demonstrate an example of how the device could be attached to a sign 12 and a horizontal support. A mount 92 and mount 94 are not elements of the present invention and are included only to show how the device could be used. Generally, the swing arms 54 are affixed to the mount 94 and the tab 70 is attached to mount 92 on the sign 12. A nut and bolt combination or other means commonly used to attach two pieces of metal together may used to affix the swing arms 54 to the mount 94 and the tab 70 to the mount 92.

A preferred variation of the invention provides a bracket for connecting a sign to a support structure comprising a first assembly that is attachable to a sign and a second assembly that is attachable to a support structure; said first assembly and said second assembly are rotatable around a common axis; a shear pin preventing relative movement between said first assembly and said second assembly; said shear pin having a predetermined shear point; when sufficient torque is applied between the first assembly and the second assembly said shear point is exceeded and the shear pin is broken permitting said first assembly to rotate substantially ninety degrees in the direction said torque is applied relative to said second assembly.

Another preferred variation of the invention provides a bracket for connecting a sign to a support structure comprising a first assembly and a second assembly; said first assembly affixable to said sign and said second assembly affixable to said support structure; said first assembly and said second assembly capable of rotation about a common axis; said first assembly having tabs that limit said rotation relative to said second assembly to substantially 180 degrees; a shear pin securing said first assembly's movement relative to said second assembly at substantially the mid-point between said 180 degrees of rotation; said shear pin shear-able at a predetermined torque between said first assembly and said second assembly thereby permitting said first assembly to rotate about said common axis relative to said second assembly.

Yet another preferred variation of the invention provides a sign bracket comprised of a first assembly and a second assembly; said first assembly further comprised of a first drum assembly, a second drum assembly and a plate assembly; said second assembly further comprised of a hub assembly and one or two swing arms; said hub assembly disposed between said first drum assembly, said second drum assembly and said plate assembly; said swing arm attached to a first end of said hub assembly and if present, a second swing arm attached to a second end of said drum assembly; said first assembly and said second assembly rotatable relative to each other about a common axis; a shear pin affixing said first assembly and said second assembly at a predetermined first position relative to each other; said first assembly further having a pair of tabs one each to limit the rotation of said swing arm(s) to substantially ninety degrees in either a first direction or second direction relative to said first position; said shear pin shear-able at a predetermined torque between said first assembly and said second assembly.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A bracket for connecting a sign to a support structure comprising a first assembly and a second assembly; said first assembly affixable to said sign and said second assembly affixable to said support structure; said first assembly and said second assembly capable of rotation about a common axis; said first assembly having tabs that limit said rotation relative to said second assembly to substantially 180 degrees; a shear pin securing said first assembly's movement relative to said second assembly at substantially a mid-point between said 180 degrees of rotation; said shear pin shear-able at a predetermined torque between said first assembly and said second assembly thereby permitting said first assembly to rotate about said common axis relative to said second assembly.

2. A sign bracket comprised of a first assembly and a second assembly; said first assembly further comprised of a first drum assembly, a second drum assembly and a plate assembly; said second assembly further comprised of a hub assembly and one or two swing arms; said hub assembly disposed between said first drum assembly, said second drum assembly and said plate assembly; said swing arm attached to a first end of said hub assembly and if present, a second swing arm attached to a second end of said drum assembly; said first assembly and said second assembly rotatable relative to each other about a common axis; a shear pin affixing said first assembly and said second assembly at a predetermined first position relative to each other; said first assembly further having a pair of tabs one each to limit the rotation of said swing arm(s) to substantially ninety degrees in either a first direction or second direction relative to said first position; said shear pin shear-able at a predetermined torque between said first assembly and said second assembly.

* * * * *